UNITED STATES PATENT OFFICE.

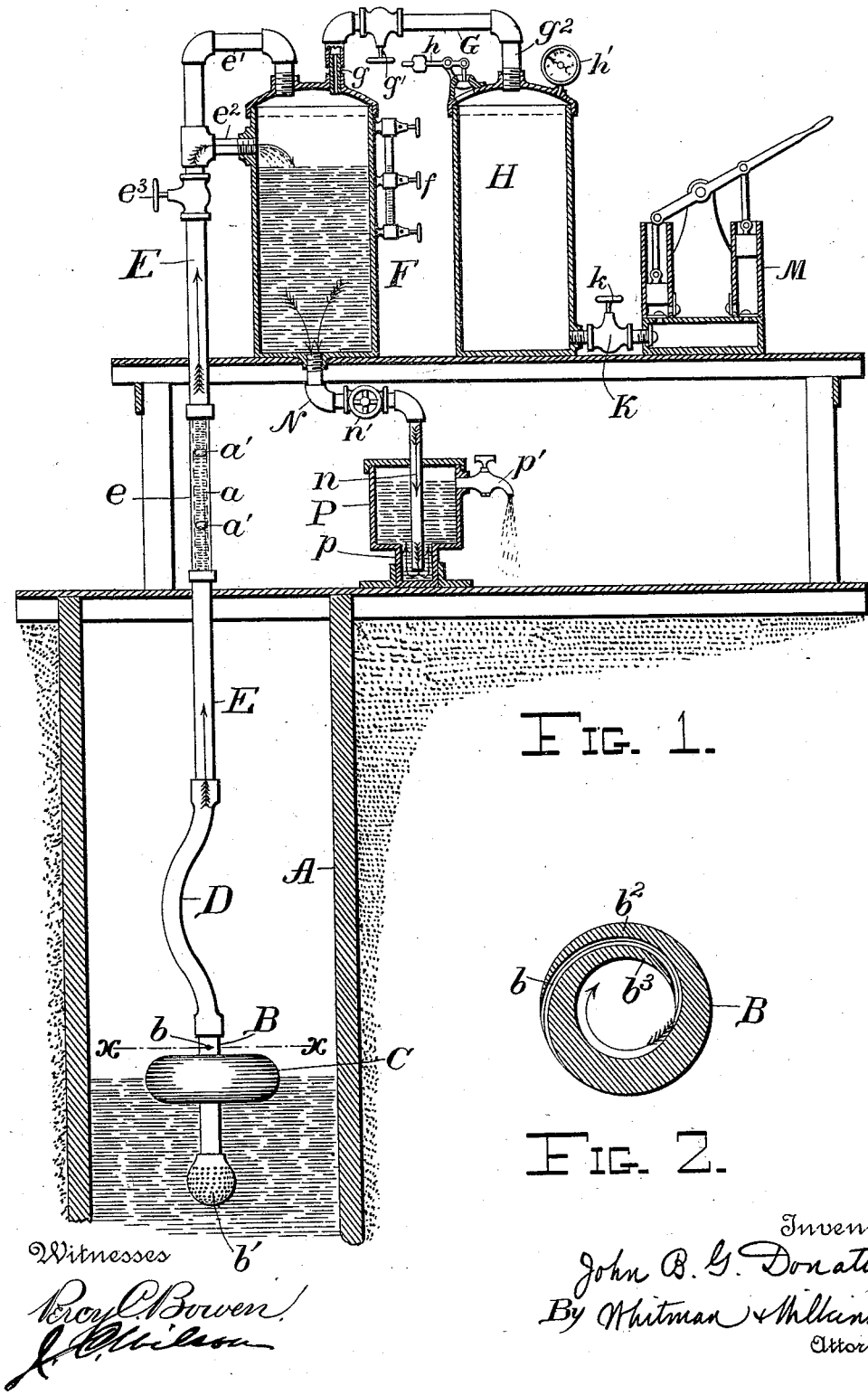

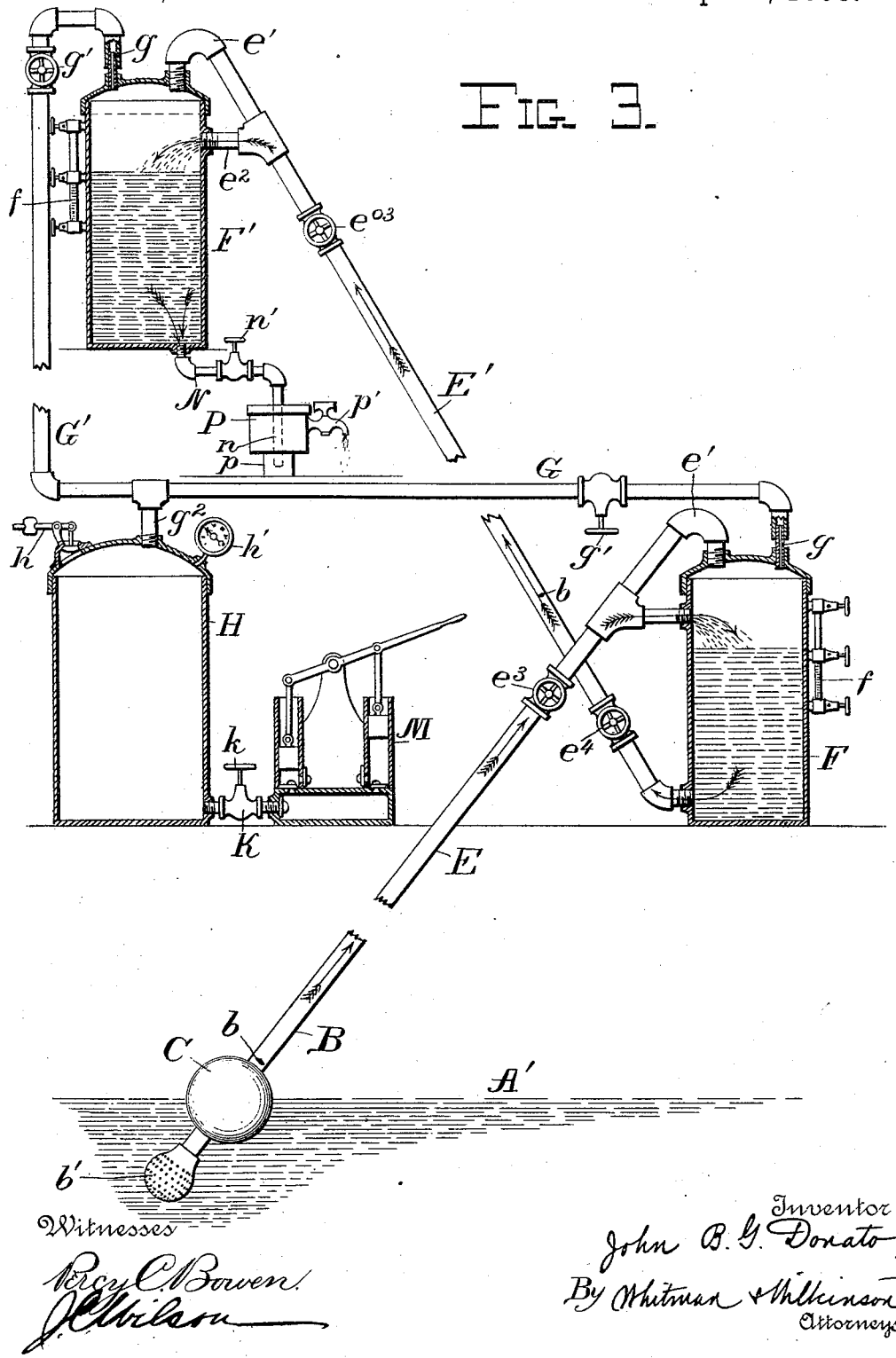

JOHN B. G. DONATO, OF OPELOUSAS, LOUISIANA, ASSIGNOR OF FORTY-NINE ONE-HUNDREDTHS TO VICTOR BOURDIN, CHARLES E. LEMELLE, AND CORNELIUS DONATO, OF SAME PLACE.

APPARATUS FOR LIFTING WATER.

SPECIFICATION forming part of Letters Patent No. 536,858, dated April 2, 1895.

Application filed February 2, 1895. Serial No. 537,042. (No model.)

*To all whom it may concern:*

Be it known that I, JOHN B. G. DONATO, a citizen of the United States, residing at Opelousas, in the parish of St. Landry and State of Louisiana, have invented certain new and useful Improvements in Apparatus for Lifting Water; and I do hereby declare the following to be a full, clear, and exact description of the invention, such as will enable others skilled in the art to which it appertains to make and use the same.

My invention relates to improvements in apparatus for lifting water, and it consists in an apparatus so constructed and arranged that water is lifted by pumping air, as will be hereinafter described.

Reference is had to the accompanying drawings, in which the same parts are indicated by the same letters throughout the several views.

Figure 1 represents a sectional elevation of my improved water lifting apparatus. Fig. 2 represents a section along the line $x$ $x$ of Fig. 1, and Fig. 3 represents the application of my apparatus to two or more lifts.

A represents a well, or other source of water supply, into which the pipe B is partly immersed. The lower end of the said pipe is preferably provided with a strainer $b'$, while the said pipe is buoyed up by a float C, and is provided with an air inlet $b$, which should be arranged about four or five inches above the surface of the water, and is normally held so by the float C. This air inlet $b$ is preferably made conchoidal in shape, as shown in Fig. 2, and since it would ordinarily be difficult to bore a hole of this shape, the parts of the pipe B contiguous to the said hole, are preferably made with two lips $b^2$ and $b^3$ into one or both of which the groove $b$ is cut, and then the parts are bent over and soldered or welded together, as shown in Fig. 2. Since the water in the well is liable to rise and fall, within certain limits, the pipe B is connected to the supply pipe E by a rubber hose or other flexible connection D. This pipe E is represented as provided with a transparent section $e$, which is not necessary, but is merely useful as illustrating the operation of the device. At its upper end the pipe E terminates in two branches $e'$ and $e^2$, and is controlled by a valve $e^3$. These branches $e'$ and $e^2$ connect to the upper portion of a receiving chamber F which may be provided with a water gage $f$, and which must be made air-tight. The air pipe G leads from the upper part of this receiving chamber H, communicating therewith by a nipple $g$, having an aperture of preferably about the same cross-section as the air inlet $b$. The outer end of the pipe G is connected by branch pipes $g^2$ to the air chamber H which is provided with a vacuum safety valve $h$ and a pressure gage $h'$, and the said air or vacuum chamber is connected by a pipe K to the air pump M, which may be of any preferred form of construction. The pipes K and G, may be closed by the valves $k$ and $g'$ respectively.

Connected to the base of the receiving tank F I provide an outlet pipe N controlled by a valve $n'$, and having the lower portion thereof $n$ projecting downward into the base $p$ of the reservoir P, from which the fluid drawn up escapes through the faucet $p'$.

The operation of the device is as follows:—The apparatus being set up as shown in Fig. 1, and the tanks F, H, and P being full of air, the valves $e^3$ and $n'$ are closed, and the air is exhausted from the tanks H and F by means of the air pump M. As soon as the gage $h'$ shows a sufficient vacuum, which vacuum will depend upon the height to which the water is to be lifted, the valve $e^3$ is opened. There will at once be an influx of air through the hole $b$, but at the same time the suction will almost instantly draw the water from the well, up in the pipe B above the said hole $b$, and the air and water will together rise in the pipe E. The air in entering the inlet $b$ will form small air pistons, such as $a'$, between which short broken columns of water $a$ will be included, and it has been found that where constant conditions prevail, these air globules or pistons will occur at regular intervals, the whole resembling as it passes through the transparent portion $e$ of the pipe E, a phantom chain pump. The curved hole for the entrance of the air causes the latter to enter the pipe in a vertical direction thus more effectually separating the water into broken columns and at the same time rendering it possible to use a larger pipe; for it will be evident that there would be less tendency for the air globules to pass upward through the water along one side of the pipe than when the air entered in a direction perpendicular to the ascending column. Again having the air inlet curved as shown to a large degree, prevents the water from spraying out through the hole. When the air and water rise to the first branch pipe $e^2$ the water will flow into the chamber F, and the air will keep on until it reaches the branch pipe $e'$, whence it will be drawn down into the chamber F. As soon as the water gage $f$ shows a sufficient height of water in the tank F, the valve $n'$ is opened, and the water flows down from the chamber F into the reservoir P, whence it escapes through the faucet $p'$. Since the column of fluid in the pipe E is composed of alternate layers of air and water it will be materially lighter than a column of water of equal area and height, and hence the water from the reservoir P will be free to escape by gravity alone even though the elevation of the said reservoir is materially higher than the surface of the water in the well. Since the air outlet $g$, from the chamber F is practically equal in cross section to the air inlet $b$, the pressure in the chamber F will at all times be materially less than in the chamber H, where the vacuum should not be made so great as to suck air through the faucet $p'$, and into the chamber F.

By making the chamber H of sufficient size, and exhausting it once or twice a day, by means of the air pump M, the operation of the apparatus may be made continuous although the motive power is only intermittently applied.

In the device shown in Fig. 3, the water is lifted twice, first into the receiving tank F as before, and then from that into the receiving tank F', whence it is delivered to the reservoir P and escapes through the faucet $p'$ as before. In this arrangement of the apparatus the exhaust pipe G from the receiving chamber F, and the exhaust pipe G' from the receiving chamber F', are both connected by the branch pipes $g^2$ to the exhaust chamber H which is arranged as in the device shown in Fig. 1. Moreover the pipe B' provided with hole $b$ as before, and float C, is represented as leading upward at an incline from the surface of a river A', and the pipe E' is also represented as leading at an incline from the lower to the upper receiving chamber. The apparatus has been found to operate more advantageously where the admission pipes E and E' are set at an incline instead of going vertically upward, probably for the reason that the revolving globules of air push the water more readily before them than they can lift it upward. In operating this form of the apparatus, the valves $e^3$ and $n'$ are closed as before, until the pressure in the vacuum chamber H has fallen to the required point, which point will depend upon the local conditions, and can be determined only by experiment. The valve $e^3$ is then opened, and the water and air speedily begin to flow into the chamber F as described with reference to Fig. 1. From the chamber F when the water reaches the elevation shown in Fig 3, the valve $e^4$ is opened, as also the valve $e^{03}$. At the same time the valve $g'$ in the pipe G is closed. This allows the air entering through the hole $b$ to soon fill up the vacuum in the upper part of the chamber F. Then the existing vacuum in the chamber H causes the pressure of air in the upper part of the chamber F to force the water in upward through the pipe E', and the water is drawn into the upper tank F' in exactly the same way as was described with reference to the tank F in Fig. 1. When the water has reached the desired level in the tank F' the valve $m'$ is opened, and the reservoir P speedily filled, the water beginning to flow out through the faucet $p'$. In this way water may be raised twice as high as where only one receiving tank is used, and similarly by increasing the number of receiving tanks and pipe connections, water may be raised through an indefinite number of steps.

In all apparatus of the kind herein described, it will only be necessary to have one vacuum chamber, and one air pump or other means for exhausting the said vacuum chamber. It will be obvious that the air pipe connections to the vacuum chamber may be run any distance, and that the water may be delivered in one place, as from a spring, and the air pump at another place, as by a waterfall any distance, even miles away.

It would readily suggest itself to any one, that it would be simpler to run a water pipe direct from the waterfall to the point where the water is to be distributed, but the waterfall may be at the base of a mountain, and the house to be supplied with water, well up on the mountain side, and at an elevation above the nearest spring.

In the drawings annexed, the diameters of the pipes are exaggerated for the purposes of clearer illustration. The diameters of the pipes should ordinarily be small, say for one-eighth to a half inch, while the capacity of the various tanks may be varied at will.

Any desired form of air pump may be used with the apparatus, or the vacuum may be obtained in the tank H by injecting steam thereinto and expelling the air, and then allowing the steam to condense, as is commonly done, in that class of apparatus known as steam and vacuum pumps. These, and many other modifications would readily suggest themselves to any one skilled in the art, which could be used without departing from the spirit of my invention.

Having thus described my invention, what I claim, and desire to secure by Letters Patent of the United States, is—

1. An apparatus for lifting water comprising a pipe projecting downward into the water and provided with an inlet located above the water and entering the said pipe in a tangential direction relative to the radii of the said pipe, and means for drawing air into said inlet, substantially as described.

2. An apparatus for lifting water comprising a pipe projecting downward into the water and provided with an inlet located above the water and entering the said pipe in a tangential direction relative to the radii of the said pipe, a receiving chamber connected to said pipe, and means for exhausting said chamber, substantially as described.

3. An apparatus for lifting water comprising a pipe projecting downward into said water and provided with an air inlet therein, means for retaining said air inlet at the desired height above the surface of the water to be lifted, a receiving tank or chamber, branch pipes connecting said water pipe to said tank, means for carrying the water from said receiving tank, an exhaust pipe connected to the upper part of said tank and having a minimum cross section of approximately the same area as the said air inlet, and an exhaust chamber connected to said exhaust pipe, substantially as and for the purposes described.

In testimony whereof I affix my signature in presence of two witnesses.

JOHN B. G. DONATO.

Witnesses:
  E. D. ESTILETT,
  J. W. GARDINER.